US008733468B2

(12) United States Patent
Teipel et al.

(10) Patent No.: US 8,733,468 B2
(45) Date of Patent: May 27, 2014

(54) SLEEVE/LINER ASSEMBLY AND HYDRAULIC HAMMER USING SAME

(75) Inventors: Blake Teipel, Waco, TX (US); Lauritz Pillers, Waco, TX (US)

(73) Assignee: Caterpillar Inc., Peoria, IL (US)

( * ) Notice: Subject to any disclaimer, the term of this patent is extended or adjusted under 35 U.S.C. 154(b) by 583 days.

(21) Appl. No.: 12/958,602

(22) Filed: Dec. 2, 2010

(65) Prior Publication Data

US 2012/0138328 A1 Jun. 7, 2012

(51) Int. Cl.

| | |
|---|---|
| ***B23B 45/16*** | (2006.01) |
| ***B25D 9/00*** | (2006.01) |
| ***B25D 13/00*** | (2006.01) |
| ***B25D 16/00*** | (2006.01) |

(52) U.S. Cl.
USPC .......... 173/135

(58) Field of Classification Search
USPC .......... 173/206, 213, 1–2, 13–17, 100–115, 173/124–129, 131–138, 141, 184, 189, 193, 173/200–201, 204, 207, 218
See application file for complete search history.

(56) References Cited

U.S. PATENT DOCUMENTS 3,095,046 A 6/1963 Mori
3,523,555 A * 8/1970 Padula .......... 137/625.64
3,712,387 A 1/1973 Vincent et al.
3,741,316 A * 6/1973 Alajouanine .......... 173/107
4,005,637 A * 2/1977 Bouyoucos et al. .......... 91/276
4,181,183 A 1/1980 Okada
4,552,227 A * 11/1985 Wohlwend .......... 173/15
5,174,386 A * 12/1992 Crover .......... 173/53
5,226,487 A 7/1993 Spektor
5,819,857 A * 10/1998 Rohrer .......... 173/90
6,119,795 A * 9/2000 Lee .......... 173/114
6,119,796 A * 9/2000 Schmid .......... 173/201
6,644,417 B1 11/2003 Millican
6,938,704 B2 * 9/2005 Berger et al. .......... 173/201
7,096,973 B2 * 8/2006 Ikuta et al. .......... 173/201
7,252,157 B2 * 8/2007 Aoki .......... 173/162.2
7,258,167 B2 * 8/2007 Shammai et al. .......... 166/264
7,290,622 B2 * 11/2007 Keskiniva et al. .......... 173/91
7,861,641 B2 * 1/2011 Weddfelt .......... 91/321
7,878,263 B2 * 2/2011 Keskiniva et al. .......... 173/90
7,886,843 B2 * 2/2011 Weddfelt .......... 175/24
8,006,776 B1 * 8/2011 Polsky .......... 173/1
8,051,926 B2 * 11/2011 Weddfelt .......... 175/293
8,215,529 B2 * 7/2012 Wu .......... 227/130
2004/0188146 A1 * 9/2004 Egerstrom .......... 175/296

(Continued)

FOREIGN PATENT DOCUMENTS

EP 0127885 12/1984
EP 335994 A1 * 10/1989 .......... B25D 9/12

*Primary Examiner* — Robert Long
(74) *Attorney, Agent, or Firm* — Liell & McNeil

(57) ABSTRACT

A hydraulic hammer includes a powercell housing that defines a hydraulic inlet and a hydraulic outlet. A work tool is partially received in, and movable with respect to, the powercell housing. A switching spool valve member is positioned in the powercell housing and is movable between a first position and a second position, and includes a control hydraulic surface. A sleeve/liner assembly is positioned in the powercell housing and defines a centerline. A piston with a plurality of hydraulic surfaces is positioned in the sleeve/liner assembly and is movable along the centerline between positions in and out of contact with the work tool. The control hydraulic surface of the switching spool valve member is exposed to fluid pressure in a switching passage, which includes a segment defined by the sleeve/liner assembly.

20 Claims, 6 Drawing Sheets

(56) References Cited

U.S. PATENT DOCUMENTS

2004/0245021 A1 12/2004 Taylor
2005/0167131 A1 8/2005 Hurskainen et al.
2008/0296035 A1 12/2008 Lohmann et al.
2011/0155403 A1 * 6/2011 Rohrer .......................... 173/114

* cited by examiner

SLEEVE/LINER ASSEMBLY AND HYDRAULIC HAMMER USING SAME

TECHNICAL FIELD

The present disclosure relates generally to hydraulic hammers, and more particularly to a sleeve/liner assembly that defines segments of a plurality of fluid passages for the hydraulic hammer.

BACKGROUND

Hydraulic hammers are one of an assortment of work tools that may be attached to the boom of an excavator, backhoe loader, skid steer or a like machine for breaking large rocks, concrete, etc. In a typical application, the hydraulic hammer is mounted to the machine boom in place of a bucket, and connected to the hydraulic system of the machine. When activated, high pressure hydraulic fluid is supplied to the hydraulic hammer to drive a reciprocating piston into and out of contact with an impact end of a work tool partially received in a powercell housing of the hydraulic hammer. U.S. patent application publication 2008/0296035 shows an example hydraulic hammer for use with an excavator.

Although the internal plumbing of hydraulic hammers from different manufacturers can vary, they often share several features in common. Among these are the use of a switching spool valve that moves between a first position that fluidly connects a downward hydraulic surface of the internal piston to high pressure from the hydraulic inlet, and fluidly exposes the downward hydraulic surface to the low pressure of the hydraulic inlet at a second position. Movement of the switching spool valve is often controlled by a switching volume defined by the piston. As the piston moves, the switching volume connects a control surface of the switching spool valve to either high pressure or low pressure. As a result, each cyclic action of the hydraulic hammer involves one reciprocation of the piston and an associated reciprocation of the switching spool valve.

Although hydraulic hammers have been generally known for many years, they can often be expensive to manufacture. For instance, the hydraulic fluid connections of the hydraulic hammer are often located near the boom mounting features of the hydraulic hammer. In order to plumb fluid connections deep into the powercell housing, fluid passageway drillings with relatively large length to diameter ratios must be made in order to facilitate the assorted fluid connections for the hydraulic hammer. Making these deep drillings is often problematic and extremely expensive.

The present disclosure is directed toward one or more of the problems set forth above.

SUMMARY OF THE DISCLOSURE

In one aspect, a hydraulic hammer includes a powercell housing that defines a hydraulic inlet and a hydraulic outlet. A machine mount that defines a plurality of pin receiving bores is attached to the powercell housing. A work tool is partially received in, and movable with respect to, the powercell housing. A switching spool valve member is positioned in the powercell housing and is movable between a first position and a second position responsive to fluid pressure on a control hydraulic surface. A sleeve/liner assembly is positioned in the powercell housing and defines a centerline. A piston with a plurality of hydraulic surfaces is positioned in the sleeve/liner assembly and movable along a centerline between a first position in contact with the work tool and a second position out of contact with the work tool. The control hydraulic surface of the switching spool valve member is exposed to fluid pressure in a switching passage, which includes a segment defined by the sleeve/liner assembly.

In another aspect, a sleeve/liner assembly for a hydraulic hammer includes an elongated sleeve that has a length, a centerline and includes an inner surface separated from an outer surface by a plurality of side ports. The inner surface defines a plurality of annular grooves that surround the centerline, each in register with a respective one of the plurality of side ports. The outer surface defines a plurality of channels extending along a segment of the length, each in register with a respective one of the plurality of side ports. An elongated liner is mounted about the centerline and includes an inner surface in contact with the outer surface of the sleeve to define a plurality of passages at the plurality of channels, respectively. The elongated liner defines a plurality of openings extending between an outer surface and the inner surface, each in register with a respective one of the plurality of passages.

DETAILED DESCRIPTION

Figure 1:
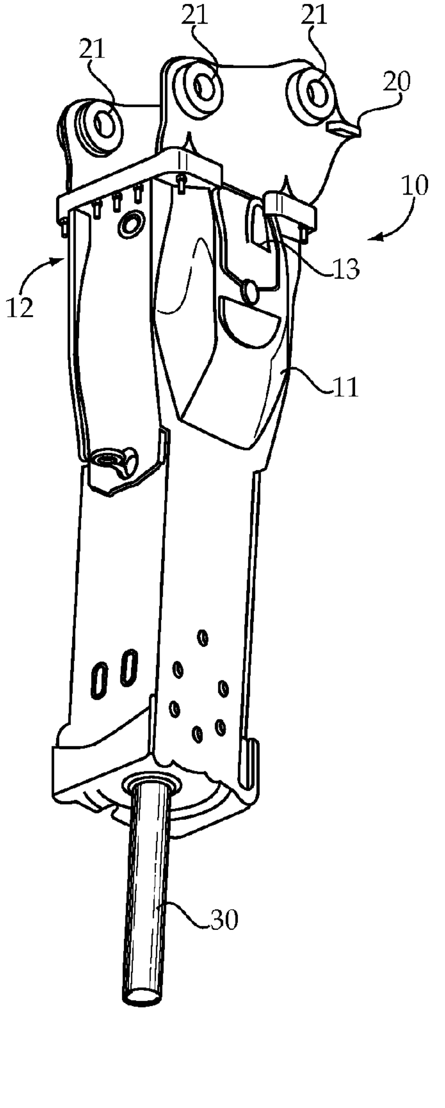
FIG. 1 is a perspective view of a hydraulic hammer according to the present disclosure.

Referring now to FIG. 1, a hydraulic hammer includes a powercell housing 11 defining a hydraulic inlet 12 (on opposite side not visible in FIG. 1) and a hydraulic outlet 13 that may be connected to a hydraulic implement system of a machine, such as an excavator, backhoe loader, skid steer or a like machine. A machine mount 20 is attached to one end of powercell housing 11 and includes a plurality of pin receiving bores 21 that are distributed in a pattern to match the boom attachment features of an associated machine (not shown). A work tool 30 is partially received in, and movable with respect to, the powercell housing 11.

Figure 2:
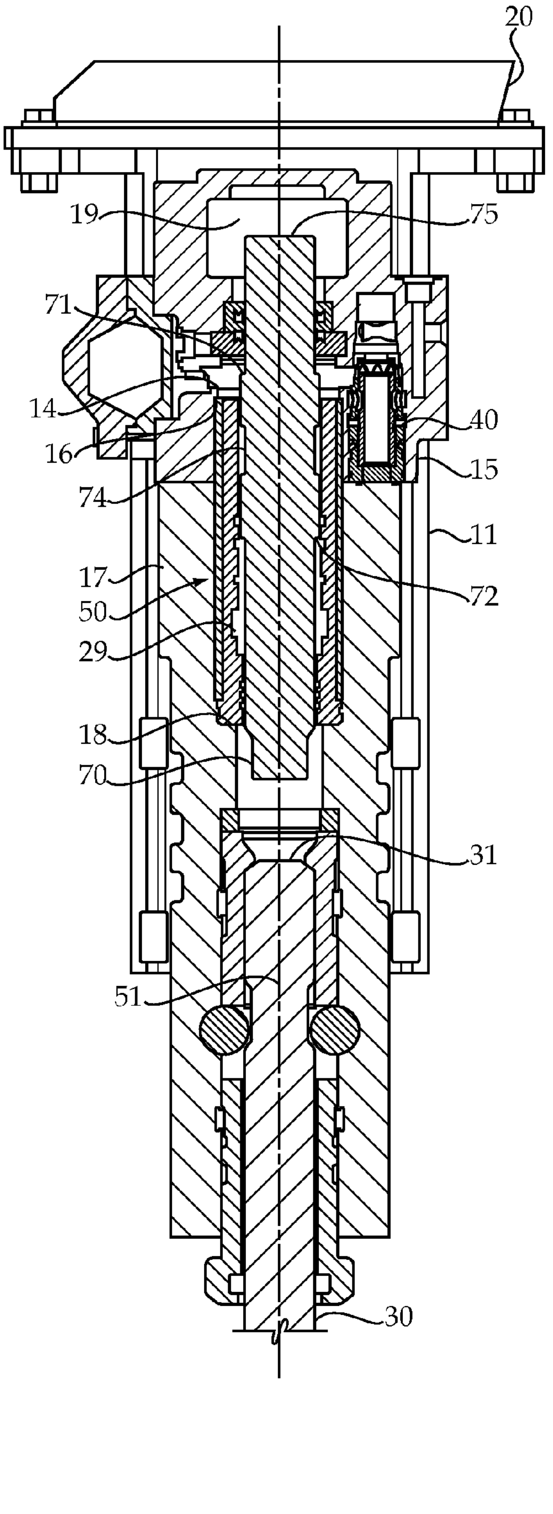
FIG. 2 is a side sectioned view of the hydraulic hammer of FIG. 1.

Referring now to FIG. 2, work tool 30 is driven to reciprocate by being impacted by a piston 70 that is driven to move between a first position in contact with impact surface 31 of work tool 30 and a second position (as shown) out of contact with work tool 30. Piston 70 is positioned in a sleeve/liner assembly 50 that avoids the need for deep drilling into the powercell housing in order to accommodate the various fluid passageways necessary to drive the reciprocation of piston 70. Piston 70 includes a downward hydraulic surface 71 exposed to fluid pressure in an upper hydraulic chamber 14, and an upward hydraulic surface 72 exposed to fluid pressure in high pressure chamber 29. Downward hydraulic surface 71 has a larger effective surface area than upward hydraulic surface 72 so that piston 70 is driven downward along centerline 51 when upper hydraulic volume 14 is fluidly connected to the high pressure hydraulic inlet 12. Depending upon the design, this downward force may or may not be assisted by an optional trapped gas volume 19 that acts upon end 75 of piston 70. A spool switching valve member 40 is positioned in powercell housing 11 and moves between a first position (as shown) at which the upper hydraulic chamber 14 is fluidly connected to the high pressure of hydraulic inlet 12, and an upward second position at which the upper hydraulic volume 14 is fluidly connected to the low pressure of hydraulic outlet 13.

Referring in addition to FIGS. 3-9, switching spool valve member 40 includes a control hydraulic surface 41 exposed to fluid pressure in a switching passage 91 that is partially defined by powercell housing 11 (segment shown by dotted line in FIG. 4) and also includes a segment defined by sleeve/liner assembly 50. Switching passage 91 includes a switching opening 58 through liner 53 (FIG. 9) that opens to a switching channel 26 (FIG. 7) defined on the outer surface 63 of sleeve 60. Switching channel 26 fluidly connects to a switching groove 45 (FIG. 7) defined by the inner surface 62 of sleeve 60 by a switching port 37 (FIG. 7) that extends between the inner surface 62 and the outer surface 63 of sleeve 60.

Figure 3:
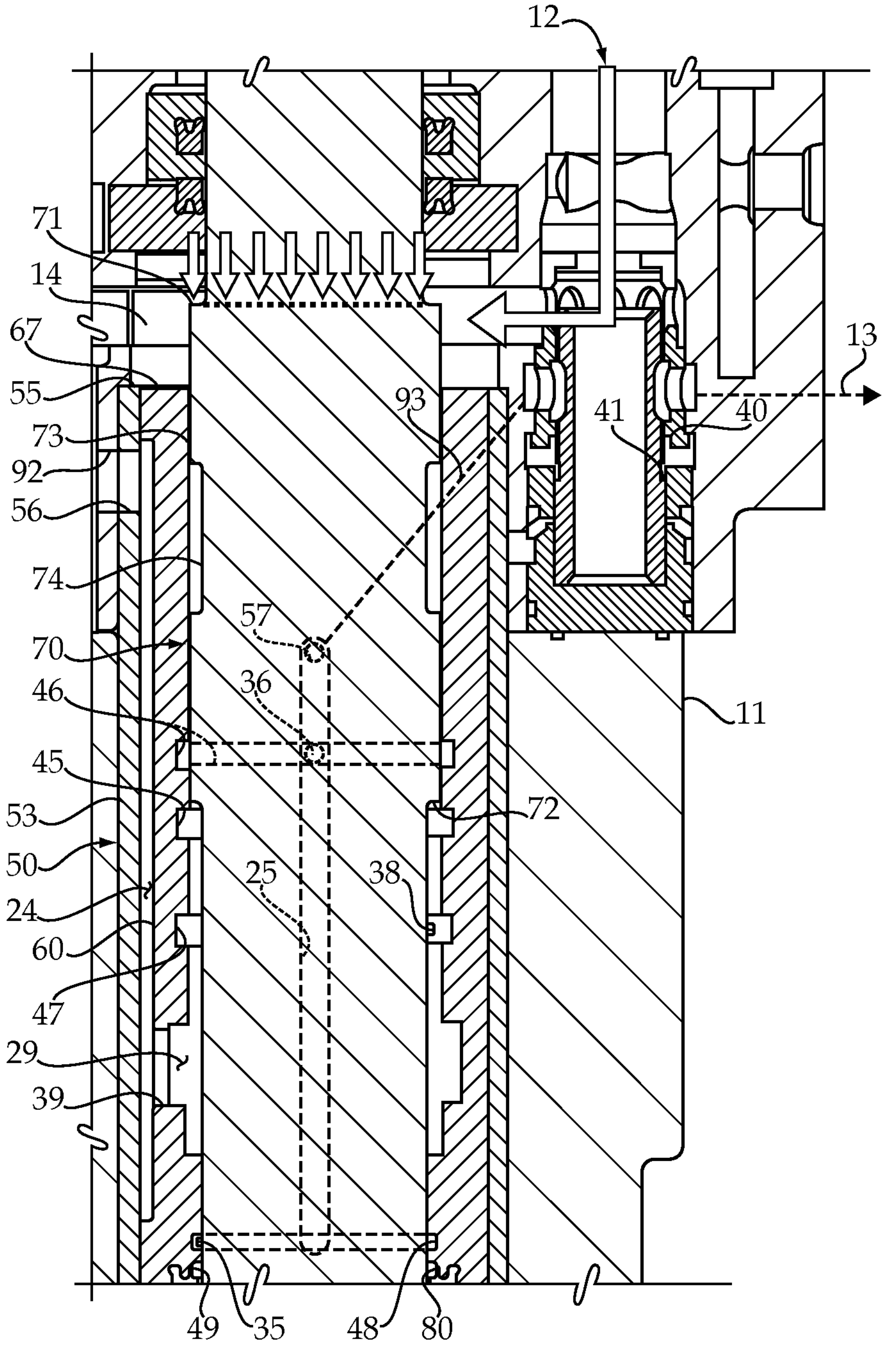
FIG. 3 is an enlarged sectioned view of the sleeve/liner assembly portion of the hydraulic hammer of FIG. 1, when the piston is beginning its downward movement.

A low pressure passage 93 is partially defined by powercell housing 11 (not visible in sectioned view but represented by a dotted line in FIG. 3) and another segment is defined by sleeve/liner assembly 50. In particular, the segment of low pressure passage 93 defined by powercell housing 11 is fluidly connected to a low pressure opening 57 (FIGS. 8 and 9) through liner 53, that is in turn fluidly connected to a low pressure channel 25 (FIG. 6) defined by the outer surface 63 of sleeve 60. Low pressure channel 25 is fluidly connected to a low pressure groove 46 (FIG. 7) by a low pressure port 36 (FIG. 6) that extends between the outer surface 63 and the inner surface 62 of sleeve 60. Another segment of low pressure groove 25 extends toward the bottom of sleeve/liner assembly 50 (FIG. 3) and opens into a seal relief groove 48 (FIG. 7) defined by the inner surface 62 of sleeve 60 by a pressure relief port 35. In other words, pressure relief port 35 extends between low pressure channel 25 on the outer surface of sleeve 60 and seal relief groove 48. A pressure seal 80 is positioned in seal groove 49 in contact with the outer surface 73 of piston 70 and sleeve 60 to seal against migration of fluid in the clearance area around piston 70. The pressure relief achieved by seal relief groove 48 protects the integrity of pressure seal 80.

A high pressure passage 92 is partially defined by powercell housing 11 (a portion of which is shown and another portion is not visible in the Figures), and another segment is defined by sleeve/liner assembly 50 to bring high pressure to high pressure chamber 29 to act at all times on upward hydraulic surface 72. The segment of high pressure passage 92 defined by powercell housing 11 is fluidly connected to a high pressure opening 56 defined by liner 53, which in turn is fluidly connected to a plurality of high pressure channels 24 (FIGS. 6 and 7) defined by the outer surface 63 of sleeve 60. Each of the high pressure channels 24 is fluidly connected to high pressure chamber 29 by individual high pressure ports 39 that extend between the outer surface 63 and inner surface 62 of sleeve 60.

Although not necessary, hydraulic hammer 10 may also includes a shut off passage 94 (FIG. 5) that is fluidly connected to the high pressure inlet 12 and is partially defined by the powercell housing 11 and another segment that is defined by sleeve/liner assembly 50. In particular, a segment of shut off passage 94 defined by powercell housing 11 (shown by dotted line in FIG. 5) is fluidly connected to a shut off opening 59 (FIG. 8) defined by sleeve 53, which in turn is fluidly connected to a shut off channel 27 (FIG. 7) defined by the outer surface 63 of sleeve 60. A shut off port 38, (FIG. 7) extends between the outer surface 63 and the inner surface 62 of sleeve 60 to fluidly connect shut off channel 27 to shut off groove 47.

Powercell housing 11 may be made of more than one component joined in a suitable manner such as by bolts. In particular, in the illustrated embodiment, powercell housing 11 includes an upper housing 15 bolted to a lower housing 17. The sleeve/liner assembly 50 is trapped between a surface 16 in upper housing 15 and at least one surface 18 of lower housing 17. In the illustrated embodiment, the upper hydraulic chamber 14 is defined by piston 70, end 67 of sleeve 60, end 55 of liner 53 and by powercell housing 11.

Referring now specifically to FIG. 6-9, elongated sleeve 60 has a length 61 and as stated earlier, includes an inner surface 62 separated from an outer surface 63 by a plurality of side ports, which include pressure relief port 35, low pressure port 36, switching port 37, shut off port 38 and a plurality four high pressure ports 39. The inner surface 62 defines a plurality of annular grooves that surround centerline 51. Each of the previously identified side ports is in register with a respective one of the annular grooves, which include seal relief groove 48, shut off groove 47, low pressure groove 46 and switching groove 45. In addition, high pressure chamber 29 is partially defined by a larger groove on the inner surface of sleeve 60. The outer surface 63 of sleeve 60 defines a plurality of channels that extend along a segment of the length 61, with each being in register with a respective one of the like named side ports. In particular, the plurality of channels include a plurality four high pressure channels 24, a low pressure channel 25, switching channel 26 and a shut off channel 27.

The elongated liner 53 may be shrink mounted about centerline 51 and include an inner surface 54 in contact with the outer surface 63 of sleeve 60 to define segments of the plurality of like named passages. In particular, the like named passages include a plurality four high pressure passages 92, switching passage 91, a low pressure passage 93 and a shut off passage 94. The elongated liner 53 also defines a plurality of openings extending between outer surface 52 and inner surface 54. The plurality of openings include a plurality four high pressure openings 56, a low pressure opening 57, a switching opening 58, a shut off opening 59 in register with like named ones of the plurality of channels.

Figure 5:
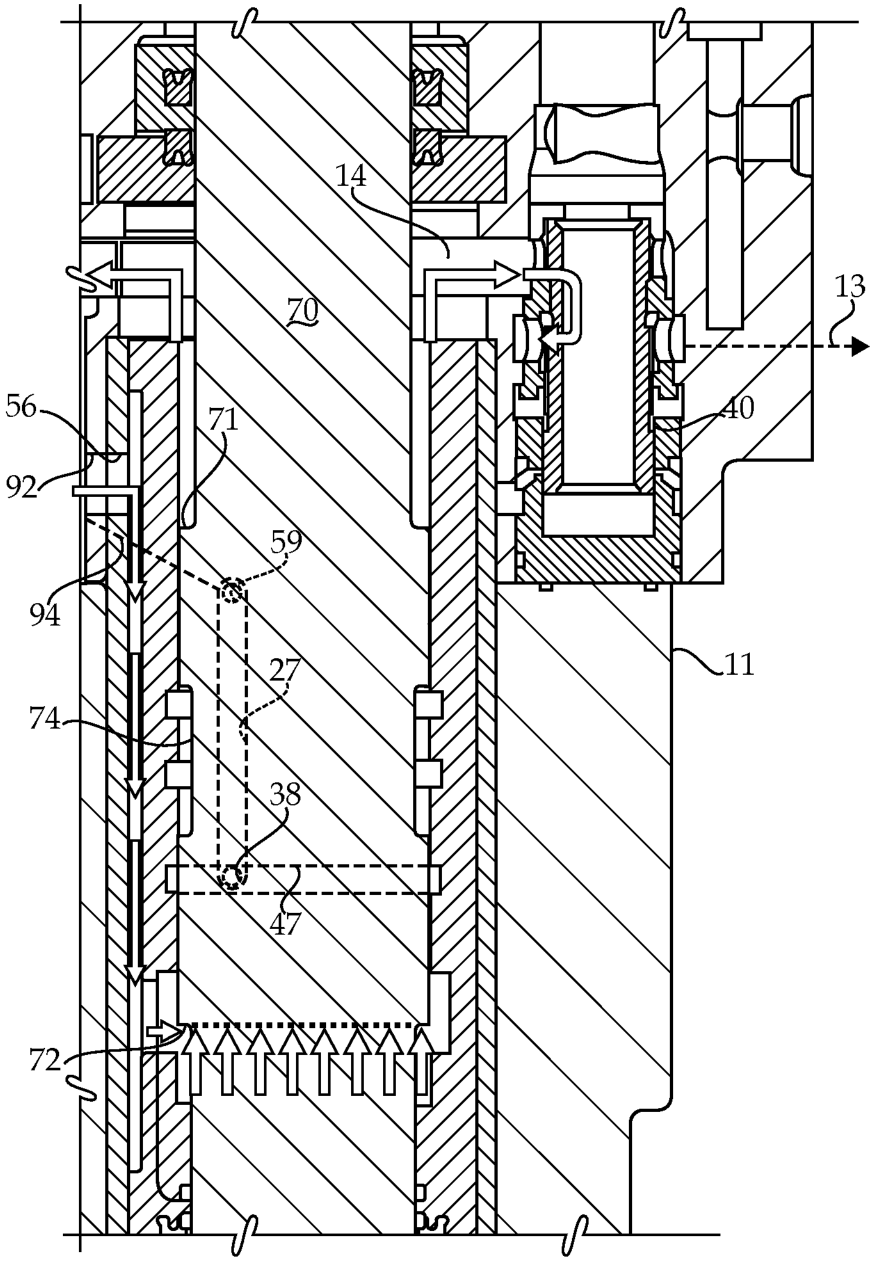
FIG. 5 is an enlarged sectioned view similar to that of FIGS. 3 and 4 except showing the piston at the bottom of its stroke and the switching spool valve member at its second position.

The switching spool valve member 40 fluidly connects the upper hydraulic chamber 14 to the hydraulic outlet 13 at a first position as shown in FIG. 5, and fluidly connects the upper hydraulic chamber 14 to the hydraulic inlet 12 at a second position as shown in FIG. 3. A piston switching volume 74 that is partially defined by the outer surface 73 of piston 70 fluidly connects the low pressure passage 93 to the switching passage 91 when piston 70 is at a first position as shown in FIG. 5. The piston switching volume 74 fluidly connects the high pressure passage 92 to the switching passage 91 when the piston 70 is at the second position as shown in FIG. 3. Thus, movement of piston 70 changes the pressure on control hydraulic surface 41 of switching spool valve member 40 causing it to move, and movement of switching spool valve member 40 in turn alternately fluidly connects upper fluid chamber 14 to high pressure inlet 12 or low pressure outlet 13.

Figure 7:
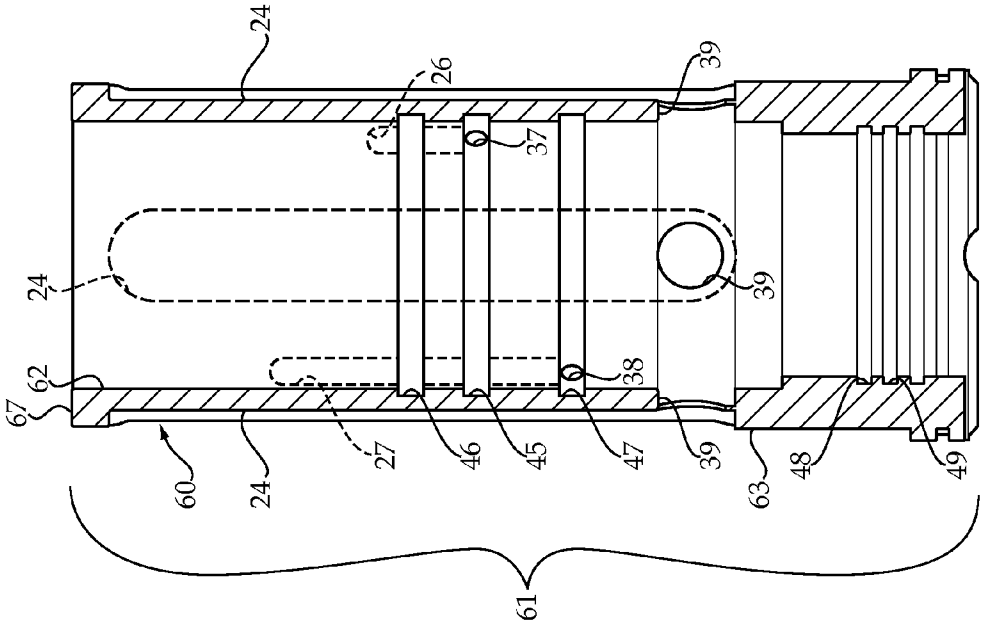
FIG. 7 is a sectioned view through the sleeve of FIG. 6.
Figure 6:
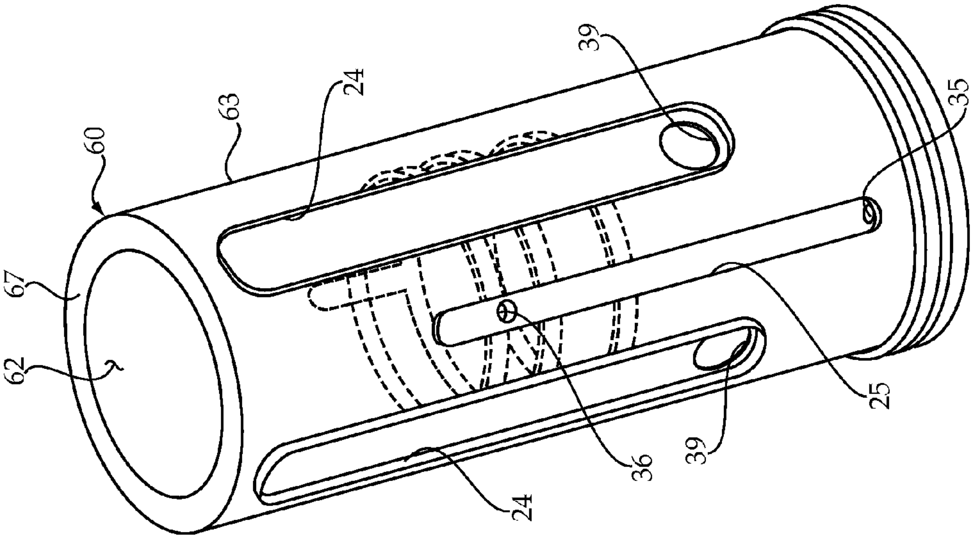
FIG. 6 is a transparent see through perspective view of a sleeve for the sleeve/liner assembly of the present disclosure.
Figure 9:
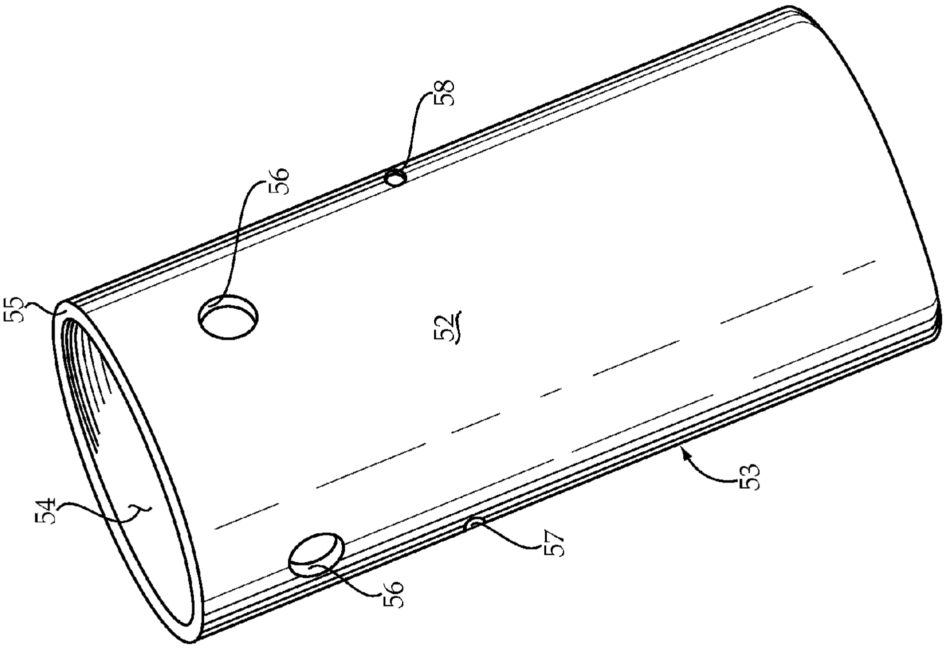
FIG. 9 is another perspective view of the liner of FIG. 8.
Figure 8:
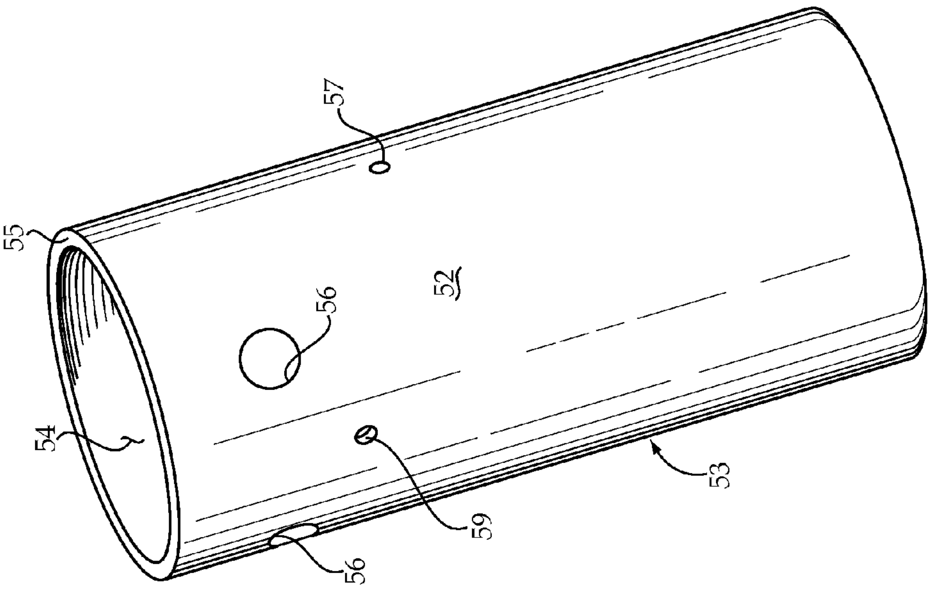
FIG. 8 is a perspective view of a liner for the sleeve/liner assembly of the present disclosure.

As best shown in FIGS. 6 and 7, each of the high pressure channels 24 are distributed around centerline 51 90° apart. Each of the low pressure channel 25, the switching channel 26 and the shut off channel 27 are positioned between a different pair of high pressure channels 24. Because high pressure chamber 29 is always connected to the high pressure of inlet 12, it can be fairly said that the high pressure passages 92 are fluidly connected to the high pressure hydraulic inlet 12 regardless of when the switching spool valve member 40 is at its first position or second position.

Each of the liked named fluid passages has a first segment defined by the powercell housing 11 that are in register with like named openings (56-59) in liner 53 to fluidly connect the powercell portion of the passages to the segments defined by the sleeve/liner assembly 50.

INDUSTRIAL APPLICABILITY

Figure 4:
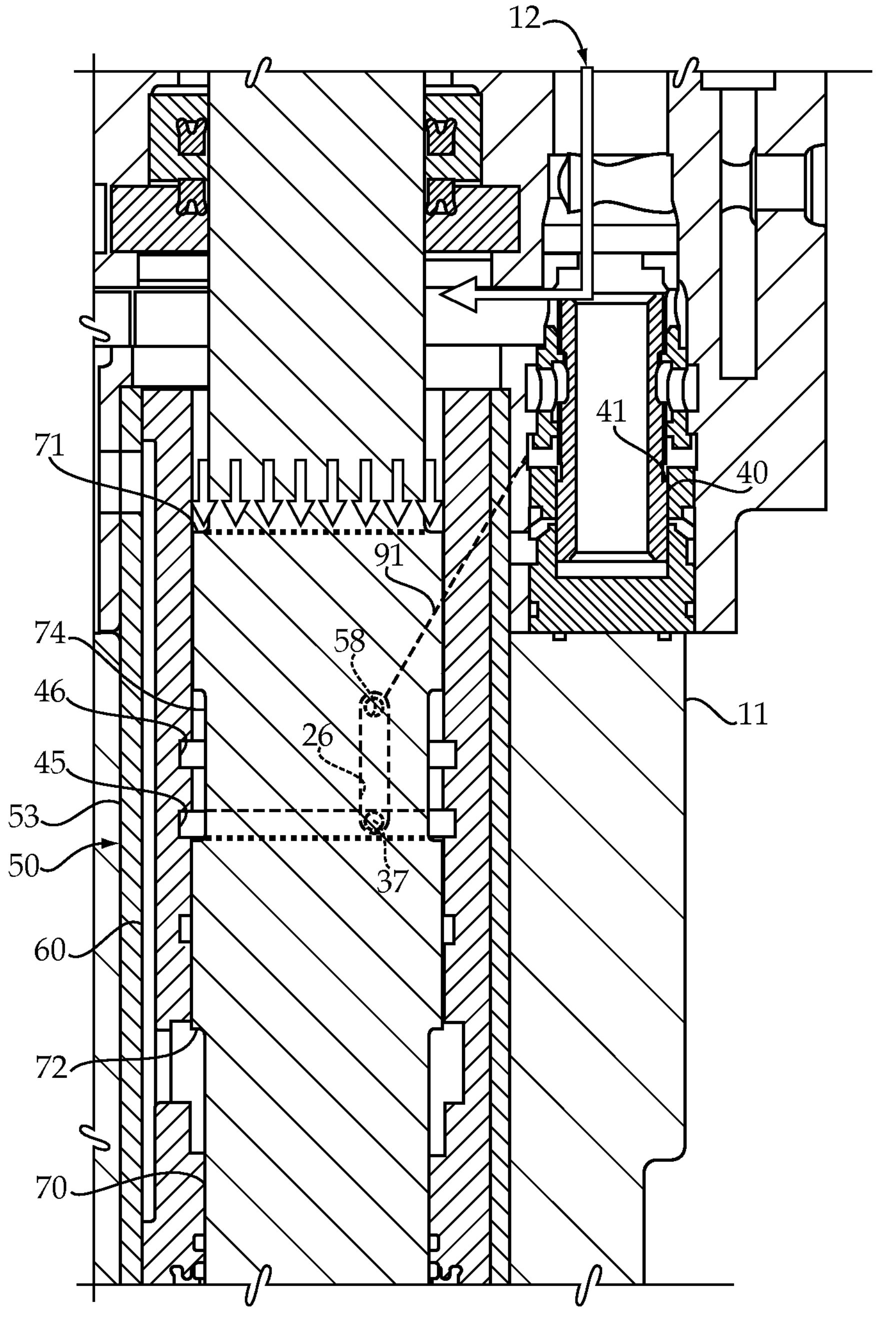
FIG. 4 is an enlarged partial sectioned view similar to FIG. 3 when the piston is moving downward, and the switching valve member begins moving from a first position to a second position.

Referring specifically to FIGS. 3-6, one cycle of the hydraulic hammer 10 is illustrated. Beginning at FIG. 3, the piston 70 is ready for acceleration downwards since switching passage 91 is fluidly connected to high pressure chamber 29 to move switching spool valve member 40 to the position shown in FIG. 3 that fluidly connects high pressure inlet 12 to upper hydraulic chamber 14 to act upon downward hydraulic surface 71. When this occurs, piston 71 begins moving downward along centerline 51. At some point in its travel as shown in FIG. 4, the piston switching volume 74 fluidly connects switching passage 91 to low pressure passage 93 via the now fluid connection existing between switching groove 45 and low pressure groove 46 as shown in FIG. 4. This causes the pressure on control hydraulic surface 41 to suddenly become low and allow switching spool valve member 40 to begin moving upward. Meanwhile, piston 71 continues traveling downward under the high pressure acting on downward hydraulic surface 71. As the piston 70 continues downward, the piston eventually strikes the impact end 31 of work tool 30 transferring energy from the work tool to whatever rock or other hard surface the work tool is in contact with. As piston 70 continues its downward movement, switching spool valve member 40 eventually moves to its upper position as shown in FIG. 5 that fluidly connects the upper hydraulic chamber 14 to the low pressure hydraulic outlet 13 as shown in FIG. 5. When this occurs, the constant high pressure acting on upward hydraulic surface 72 causes pistons 70 to begin retract towards its upward position to repeat the cycle.

In the event that piston 71 over travels in its downward motion, the piston switching volume 74 can act to fluidly connect switching groove 45 to shut off groove 47. When this occurs, high pressure again acts upon control hydraulic surface 41 of the switching spool valve member 40 causing it to move quickly downward toward the position shown in FIG. 3, to again resume the high pressure fluid connection to upper hydraulic chamber 14 and hold piston 70 in its downward most position to end the reciprocating movement of the piston due to the automatic over travel shut down provided by shut off passage 94.

By utilizing a sleeve/liner assembly 50 as disclosed, deep drillings into the powercell housing 11 can be avoided and segments of the respective fluid passageways can instead be defined by the sleeve/liner assembly 50. The various passageways may be sealed from one another by shrink fitting liner 53, which may be a hollow cylinder of a uniform wall thickness onto the outer surface 63 of sleeve 60 using known techniques. The sleeve/liner assembly 50 may also allow for hydraulic hammers to more easily be remanufactured by replacing that component during an overhaul. In addition, those skilled in the art will appreciate that the sleeve/liner assembly 50 can find potential application in virtually any hydraulic hammer that utilizes deep drill passages in its housing to facilitate the various fluid connections to cause its internal pistons to reciprocate during normal operation. Those skilled in the art will appreciate that a sleeve/liner assembly according to the present disclosure can include any number of passages distributed around its periphery to facilitate proper functioning of hydraulic hammers having different plumbing characteristics apart from that shown in the illustrated embodiments. The various grooves and channels defined by sleeve 60 may be milled using conventional techniques which are substantially less expensive and more easily controlled relative to the deep drillings required in prior art hydraulic hammers. By utilizing a hydraulic hammer 10 with a two piece body (15, 17), the sleeve/liner assembly 50 provides a means to transmit the hydraulic oil from a top to a bottom of the piston, and concentrically align the body sections of the hammer. Using milled channels instead of drilled holes for oil passages reduces machining time, reduces cost of disposable tooling, and reduces the overall thickness of the hydraulic hammer, which allows a compact design. In addition, the use of a sleeve/liner assembly potentially avoids the need for cross drilled bores from the side of the hydraulic hammer in order to facilitate fluid connections, and also avoids the need for plugs in those side bores.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A hydraulic hammer comprising:

a powercell housing defining a hydraulic inlet and a hydraulic outlet;

a machine mount defining a plurality of pin receiving bores attached to the powercell housing;

a work tool partially received in, and movable with respect to, the powercell housing;

a switching spool valve member positioned in the powercell housing and being movable between a first position and a second position, and including a control hydraulic surface;

a sleeve/liner assembly positioned in the powercell housing and defining a centerline;

a piston with a plurality of hydraulic surfaces positioned in the sleeve/liner assembly and movable along the centerline between a first position in contact with the work tool and a second position out of contact with the work tool;

the control hydraulic surface being exposed to fluid pressure in a switching passage, which includes a segment defined by the sleeve/liner assembly; and the sleeve/liner assembly includes an elongated sleeve that has a length and includes an outer surface defining a channel extending along a segment of the length, an inner surface defining an annular groove that encircles the centerline, and further defining a side port extending from the annular groove to the channel.

2. The hydraulic hammer of claim 1 wherein the sleeve/liner assembly includes:

the elongated sleeve includes the inner surface separated from the outer surface by a plurality of side ports, which includes the side port;

the inner surface defining a plurality of annular grooves, which includes the annular groove, that encircle the centerline, each in register with a respective one of the plurality of side ports;

the outer surface defining a plurality of channels, which includes the channel, extending along a respective segment of the length, each in register with a respective one of the plurality of side ports;

an elongated liner mounted about the centerline and including an inner surface in contact with the outer surface of the sleeve to define segments of a plurality of passages at the plurality of channels, respectively; and the plurality of passages include the switching passage, a high pressure passage and a low pressure passage.

3. The hydraulic hammer of claim 2 wherein the piston includes an outer surface that defines a piston switching volume positioned in the sleeve that fluidly connects the low pressure passage to the switching passage when at the first position; and the piston switching volume fluidly connects the high pressure passage to the switching passage when the piston is at the second position.

4. The hydraulic hammer of claim 3 wherein the piston includes a downward hydraulic surface exposed to fluid pressure in an upper hydraulic chamber disposed in the powercell housing;

the switching spool valve member fluidly connects the upper hydraulic chamber to the hydraulic outlet at the first position, and fluidly connects the upper hydraulic chamber to the hydraulic inlet at the second position.

5. The hydraulic hammer of claim 4 including a pressure seal positioned between the piston and the sleeve; and wherein the sleeve defines a seal relief groove fluidly connected to the low pressure passage by a pressure relief port.

6. The hydraulic hammer of claim 5 wherein the plurality of annular grooves include a switching groove positioned between a low pressure groove and a shut off groove;

the plurality of channels include at least one high pressure channel, a low pressure channel, a switching channel and a shut off channel;

the plurality of side ports include a low pressure port, a switching port, a shut off port, the pressure relief port and at least one high pressuring port;

the plurality of passages include a plurality of high pressure passages, the low pressure passage, the switching passage and a shut off passage.

7. The hydraulic hammer of claim 6 wherein the plurality of high pressure passages are distributed around the centerline; and each of the low pressure passage, the switching passage and the shut off passage being positioned between a different pair of the plurality of high pressure passages.

8. The hydraulic hammer of claim 7 wherein the piston includes an upward hydraulic surface exposed to fluid pressure in the high pressure passages.

9. The hydraulic hammer of claim 8 wherein the high pressure passages are fluidly connected to the hydraulic inlet when the switching valve member is at the first position or the second position.

10. The hydraulic hammer of claim 4 wherein the upper hydraulic chamber is defined by the piston, the powercell housing, one end of the sleeve and one end of the liner.

11. The hydraulic hammer of claim 2 wherein the powercell housing defines different segments of the plurality of passages in register with respective ones of the plurality of openings in the liner.

12. The hydraulic hammer of claim 1 wherein the powercell housing includes an upper housing bolted to a lower housing; and the sleeve/liner assembly is trapped between at least one surface of the upper housing and at least one surface of the lower housing.

13. A hydraulic hammer comprising:

a powercell housing defining a hydraulic inlet and a hydraulic outlet;

a work tool partially received in, and movable with respect to, the powercell housing;

a switching spool valve member positioned in the powercell housing and being movable between a first position and a second position, and including a control hydraulic surface;

a sleeve/liner assembly positioned in the powercell housing and defining a centerline, and including a sleeve and a liner;

a piston with a plurality of hydraulic surfaces positioned in the sleeve/liner assembly and movable along the centerline between a first position in contact with the work tool and a second position out of contact with the work tool; and the control hydraulic surface being exposed to fluid pressure in a switching passage, which includes a segment partially defined by a channel extending along a segment of a length of the sleeve of the sleeve/liner assembly and partially defined by an inner surface of the liner of the sleeve/liner assembly.

14. The hydraulic hammer of claim 13 wherein the sleeve/liner assembly includes:

the sleeve includes an inner surface separated from an outer surface by a plurality of side ports;

the inner surface defining a plurality of annular grooves that each encircle the centerline, each in register with a respective one of the plurality of side ports;

the channel is one of a plurality of channels, and the outer surface defining the plurality of channels extending along the length, each in register with a respective one of the plurality of side ports;

the inner surface of the liner being in contact with the outer surface of the sleeve to define segments of a plurality of passages at the plurality of channels, respectively; and the plurality of passages include the switching passage, a high pressure passage and a low pressure passage.

15. The hydraulic hammer of claim 14 wherein the piston includes an outer surface that defines a piston switching volume positioned in the sleeve that fluidly connects the low pressure passage to the switching passage when at the first position; and the piston switching volume fluidly connects the high pressure passage to the switching passage when the piston is at the second position;

the piston includes a downward hydraulic surface exposed to fluid pressure in a hydraulic chamber disposed in the powercell housing;

the switching spool valve member fluidly connects the hydraulic chamber to the hydraulic outlet at the first position, and fluidly connects the hydraulic chamber to the hydraulic inlet at the second position.

16. The hydraulic hammer of claim 15 wherein the sleeve defines a seal relief groove fluidly connected to the low pressure passage by a pressure relief port;

wherein the plurality of annular grooves include a switching groove positioned between a low pressure groove and a shut off groove;

the plurality of channels include at least one high pressure channel, a low pressure channel, a switching channel and a shut off channel;

the plurality of side ports include a low pressure port, a switching port, a shut off port, the pressure relief port and at least one high pressuring port;

the plurality of passages includes a plurality of high pressure passages, the low pressure passage, the switching passage and a shut off passage;

wherein the plurality of high pressure passages are distributed around the centerline; and each of the low pressure passage, the switching passage and the shut off passage being positioned between a different pair of the plurality of high pressure passages.

17. A hydraulic hammer comprising:

a powercell housing defining a hydraulic inlet and a hydraulic outlet;

a work tool partially received in, and movable with respect to, the powercell housing;

a switching spool valve member positioned in the powercell housing, including a control hydraulic surface and being movable between a first position and a second position responsive to a fluid pressure on the control hydraulic surface;

a sleeve/liner assembly positioned in the powercell housing and defining a centerline;

a piston with a plurality of hydraulic surfaces positioned in the sleeve/liner assembly and movable along the centerline between a first position in contact with the work tool and a second position out of contact with the work tool; and the sleeve/liner assembly includes an elongated sleeve that has a length and includes an outer surface defining a plurality of channels extending along a segment of the length, and an elongated liner with an inner surface in contact with the outer surface of the sleeve to define segments of a plurality of passages at the plurality of channels, respectively; and the plurality of passages include a switching passage, a high pressure passage and a low pressure passage.

18. The hydraulic hammer of claim 17 wherein the liner is shrink mounted onto the sleeve.

19. The hydraulic hammer of claim 18 wherein the liner is a hollow cylinder of a uniform wall thickness.

20. The hydraulic hammer of claim 17 wherein the sleeve includes an inner surface separated from an outer surface by a plurality of side ports;

the inner surface defining a plurality of annular grooves that encircle the centerline, each in register with a respective one of the plurality of side ports; and each of the plurality of channels being register with a respective one of the plurality of side ports.

* * * * *